| United States Patent [19] | [11] Patent Number: 4,645,172 |
|---|---|
| Wilson | [45] Date of Patent: Feb. 24, 1987 |

[54] APPARATUS FOR MOUNTING A MOTORCYCLE ENGINE TO A DUNE BUGGY

[76] Inventor: Cecil R. Wilson, Rt. 2, Box 301C, Atoka, Okla. 74525

[21] Appl. No.: 737,236

[22] Filed: May 23, 1985

[51] Int. Cl.⁴ .......................................... F16M 1/024
[52] U.S. Cl. .................................................. 248/674
[58] Field of Search .............. 248/558, 637, 645, 670, 248/672–675

[56] References Cited

U.S. PATENT DOCUMENTS

| 2,467,770 | 4/1949 | Mulheim | 248/674 |
|---|---|---|---|
| 2,662,988 | 12/1953 | Mcleim | 248/674 |
| 3,153,388 | 10/1964 | Cheely | 248/674 |
| 3,191,710 | 7/1965 | Reynolds | 248/674 |
| 3,373,708 | 3/1968 | Takahashi | 248/674 |
| 3,432,705 | 3/1969 | Lindtveit | 248/674 |
| 3,580,367 | 5/1971 | McCarthy | 248/674 |
| 3,746,289 | 7/1973 | Johnsen | 248/674 |
| 4,271,545 | 6/1981 | Christian | 248/674 |

*Primary Examiner*—Reinaldo P. Machado
*Assistant Examiner*—Alvin Chin-Shue
*Attorney, Agent, or Firm*—James E. Bradley

[57] ABSTRACT

An adapter plate allows a motorcycle engine to be mounted to a transaxle in a dune buggy. The engine is of the type having an output shaft located on one side of the engine that faces rearwardly. The transaxle has a bell housing that is centered and faces forwardly. The plate fits between the bell housing and the engine. The plate has an aperture that aligns with the output shaft of the engine and the input shaft of the transaxle. The shaft extends through the aperture for interconnecting the transaxle with the engine. Inner holes in the plate encircle the aperture for bolting the plate to the output shaft housing. Outer holes encircle the aperture and are spaced further outward for bolting the plate to the bell housing. Lugs on the forward side of the plate bolt to engine mounting lugs on the engine. A support plate extends from the frame of the vehicle down to the adapter plate and is bolted thereto for providing support.

2 Claims, 4 Drawing Figures

APPARATUS FOR MOUNTING A MOTORCYCLE ENGINE TO A DUNE BUGGY

BACKGROUND OF THE INVENTION

1. Field of the Invention:

This invention relates in general to motor vehicle mounting systems, and in particular to an apparatus for mounting a motorcycle engine to a transaxle in a dune buggy.

2. Description of the Prior Art:

For several years, recreational vehicles known as dune buggies have been available. These vehicles have oversized tires for driving on sand dunes. Typically, a dune buggy will have an exposed metal tubular frame. The drive means normally is an air cooled rear engine coupled to a transaxle which drives the rear wheels. The transaxle also contains a transmission section. Normally, the engine is a Volkswagen engine, as well as the transaxle.

While successful, these types of engines are expensive to modify if one wishes increased performance for competition. The performance of the stock engine is not very good. Also, the engines tend to overheat and are not very economical for fuel consumption.

Motorcycles having stock high performance engines are available. These engines will run at high RPM's and are fuel efficient. The larger engines are water cooled and could generate more torque than stock dune buggy Volkswagen engines.

Motorcycle engines, to applicant's knowledge, have not been installed in dune buggies. A motorcycle engine of a larger type has an internal transmission and an output shaft located on one side. This output shaft extends back to the side of the rear wheel for driving the rear wheel. There is no bell housing on the rear of the engine that could be coupled to the bell housing of a transaxle.

SUMMARY OF THE INVENTION

In this invention, an apparatus is shown for mounting a motorcycle engine in a dune buggy, and connecting it to a transaxle. The apparatus includes an adapter plate which as a portion that has holes around the periphery for mounting to the bell housing of the transaxle. The bell housing is oriented to face forwardly. The adapter plate has a large hole that aligns with the input shaft means in the bell housing. The motorcycle engine is mounted in the vehicle offset on one side, with the output shaft means aligned with the hole in the adapter plate. The adapter plate has inner holes that are used to couple to the engine around the output shaft means. A shaft segment extends between the input and output shaft means.

The adapter plate further has lugs on its forward side. Upper lugs mate with upper engine mounts on the engine. Lower lugs mate with lower engine mounts on the engine. A support plate is coupled to a frame member of the vehicle and extends down to the adapter plate to provide support.

DESCRIPTION OF THE PREFERRED EMBODIMENT

Figure 1:
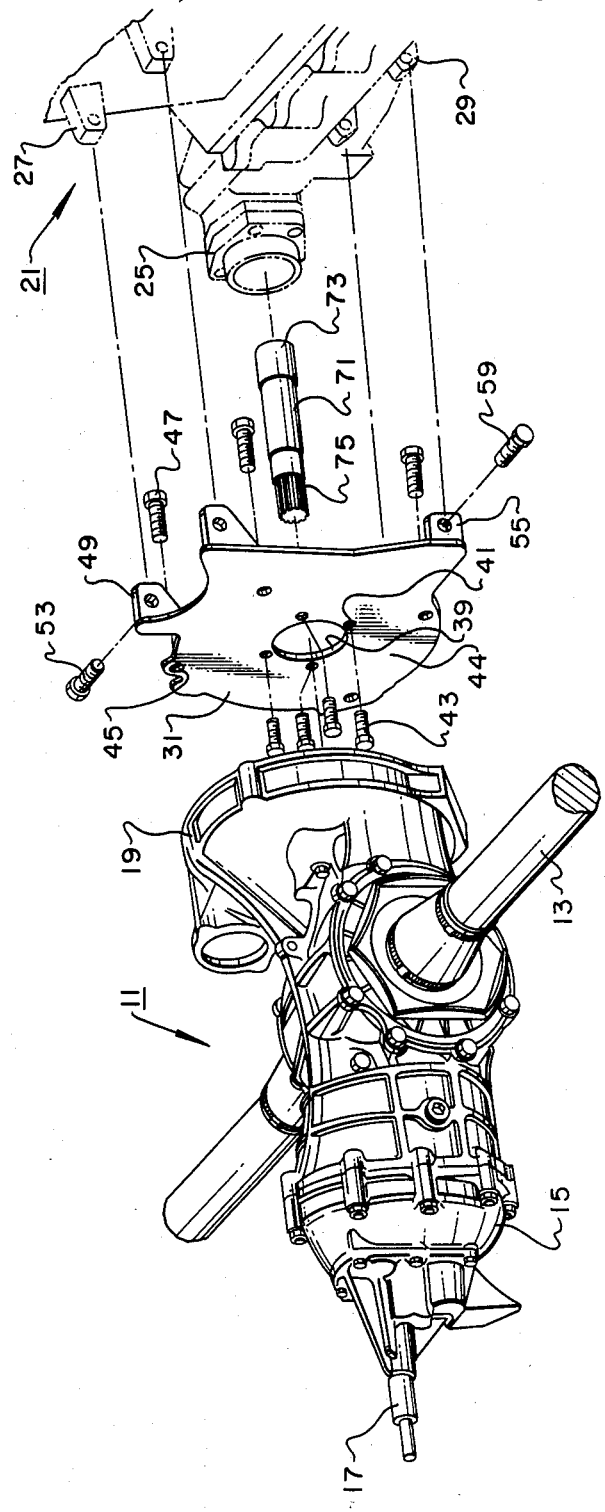
FIG. 1 is a perspective view of an apparatus for mounting a motorcycle engine to a transaxle, showing the transaxle and a portion of the engine.
Figure 2:
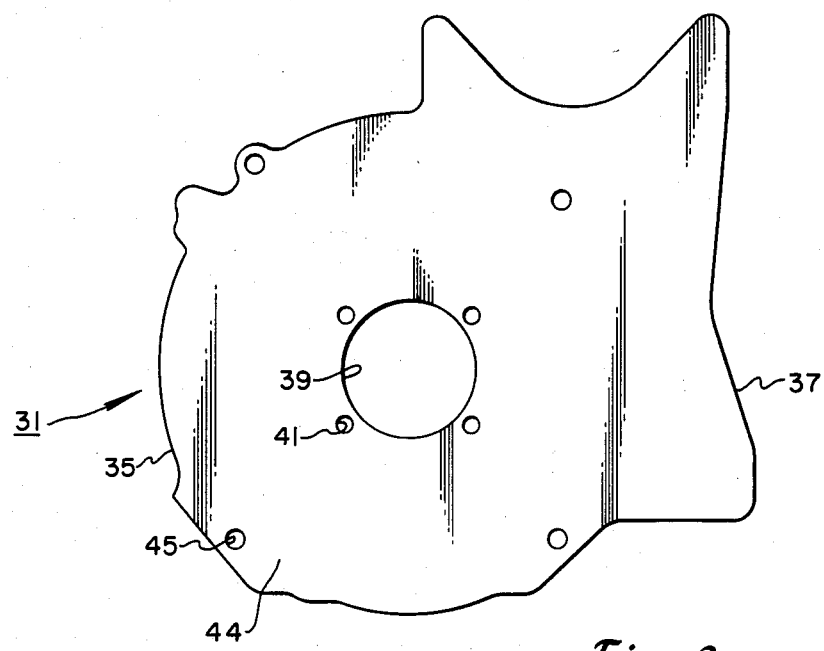
FIG. 2 is a view of the rear side of the adapter plate shown in FIG. 1.

Referring to FIG. 1, a transaxle 11 of a conventional type is shown. Transaxle 11 has axle members 13 extending outwardly from each side for driving two rear wheels (not shown) of a dune buggy (not shown). Transaxle 11 contains a differential portion (not shown) and a transmission section 15. Shift control 17 extends rearwardly from the transmission section 15 for changing the various gears. Transaxle 11 has a conventional bell housing 19. The transaxle 11 is oriented so that bell housing 19 faces forwardly. Bell housing 19 will be located on the longitudinal axis of the vehicle, and encloses within it an input shaft means (not shown) which is basically a splined socket for receiving a splined shaft for driving the transaxle 11. Transaxle 11 is preferably manufactured by Volkswagen for use in air cooled rear engine Volkswagen vehicles. Bell housing 19 faces rearwardly in a Volkswagen.

A portion of a motorcycle engine 21 is shown in FIG. 1. Engine 21 is preferably a four cylinder water cooled engine. It is of the type having a transmission section 23 (FIG. 4) mounted integrally with the engine 21. It has an output shaft means 25 located on one side. In a motorcycle, the output shaft means 25 connects to a shaft (not shown) that extends to one side of the rear wheel and connects to a mechanism at the rear wheel for driving the rear wheel by means of a shaft rather than a chain. The engine 21 will be mounted in the dune buggy offset from the longitudinal axis so that the output shaft means 25 will be located on the longitudinal axis. The output shaft means 25 includes a cylindrical collar and will be aligned with the transaxle 11 input shaft means (not shown) which is concentrically located in the bell housing 19.

Engine 21 has a pair of upper mounting lugs 27 mounted on its rear side. Mounting lugs 27 are spaced apart from each other and are conventional. Normally, they will be bolted to portions of a motorcycle frame. A pair of lower mounting lugs 29 are spaced below the upper mounting lugs 27. The lower mounting lugs 29 normally bolt to a portion of the frame of a motorcycle.

Figure 3:
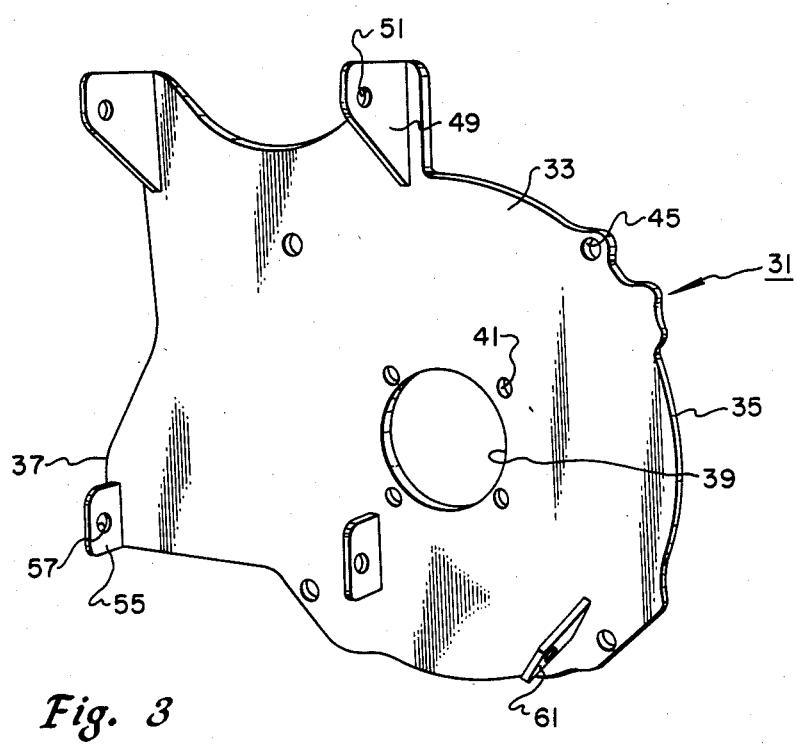
FIG. 3 is a perspective view of the forward side of the adapter plate of FIG. 1.

An adapter plate 31 enables the motorcycle engine and transmission 21 to be mounted to the transaxle 11. Adapter plate 31, as shown in FIG. 3, is a flat plate with a forward side 33 that faces the rearward side of the engine 21. There is a generally circular portion 35 that extends about 210 degrees and is configured to mount flush to the bell housing 19 (FIG. 1). The circular portion 35 joins a somewhat rectangular portion 37 that is located offset and slightly upward from the circular portion 35. An aperture 39 is located concentrically in the circular portion 35. Aperture 39 aligns with the output shaft means 25 (FIG. 1) and receives within it the collar of the output shaft means 25. There are four inner holes 41 spaced around the aperture 39. These holes 41 allow bolts 43 (FIG. 1) to pass through to connect to the housing portion of the output shaft means 25. The heads of the bolts 43 will thus be located on the rearward side 44 of the adapter plate 31 when connected.

There are four outer holes 45 that are spaced outward from the inner holes 41. The outer holes 45 are positioned to align with holes in the bell housing 19.

Two of the outer holes 45 will be located adjacent the edge of the circular portion 35, with the fourth hole 45 being located within the generally rectangular portion 37. Bolts 47 (FIG. 1) are adapted to extend through the holes 45 and into holes in the bell housing 19 for bolting the rearward side 44 of the adapter plate 31 to the bell housing 19.

Two upper lugs 49 are welded to the forward side 33 of adapter plate 31. Upper lugs 49 are perpendicular to the adapter plate 31 and extend forwardly. Upper lugs 49 are spaced apart from each other a distance selected so as to receive the engine mounts 27 closely between them. Each upper lug 49 has a hole 51 through which a bolt 53 (FIG. 1) extends to bolt the lugs 49 and engine mounts 27 together. The lug 49 closest to the aperture 39 has its lower edge located approximately the same distance from aperture 39 as the distance from aperture 39 to the periphery of the circular portion 35.

There are a set of lower lugs 55 spaced below the upper lugs 49 and below and to one side of the aperture 39. Lower lugs 55 are not on vertical lines from the upper lugs 49, but are positioned so as to receive the lower engine mounts 29 closely between them. Each lower lug 55 has a hole 57 for receiving a bolt 59 (FIG. 1) to mount the lower lugs 55 with the engine mounts 29 (FIG. 1). As can be seen in FIG. 3, both of the upper lugs 49 and the lower lugs 55 are offset from and located on one side of the axis of the aperture 39. A vertical line passing through either of the upper or lower lugs 49, 55 that are closest to aperture 39 will be on the same side of the axis of aperture 39 as the other lugs 49, 55. Referring still to FIG. 3, adapter plate 31 has another lug 61 on its forward side 33. Lug 61 is used to couple the control rod (not shown) for the shifting mechanism 17 (FIG. 1) of the transaxle 19.

Figure 4:
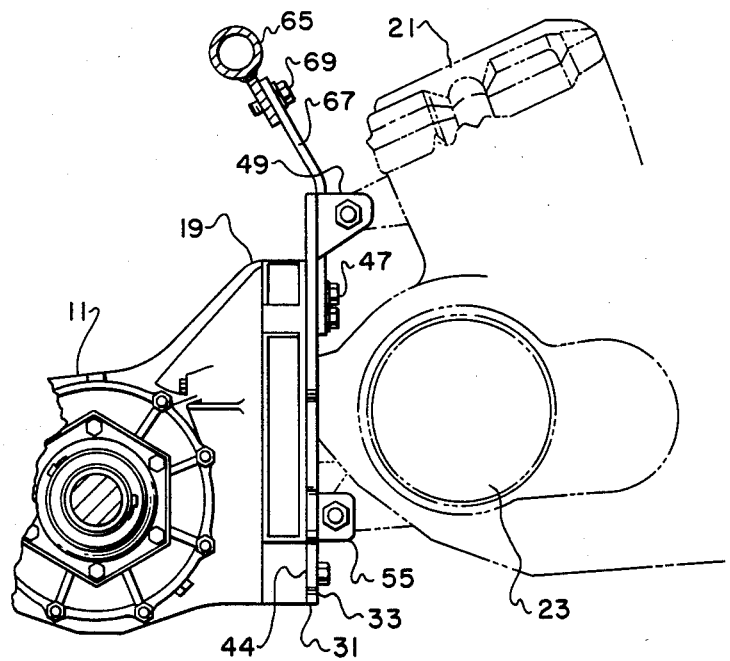
FIG. 4 is a side view of the adapter plate of FIG. 1, shown mounted between the transaxle and engine.

Referring to FIG. 4, the vehicle has a frame member 65 that extends above the engine 21 and transaxle 11. A support plate 69 is bolted to the frame member 65 by bolts 69. The support plate 67 is an angled plate that extends down to the upper portions of the adapter plate 31. The support plate 67 has holes (not shown) which register with the two uppermost holes 45 (FIG. 3). The same bolts 47 that secure the plate 31 to the bell housing 19, also secure the support plate 67 to the adapter plate 31. Support plate 67 supports the weight of the transaxle 11 and engine 21 in the central area.

Referring again to FIG. 1, a shaft 71 has a splined socket 73 on its forward end for sliding into the output shaft means 25 and mating with the shaft (not shown) contained therein. Shaft 71 has a splined rearward end 75 that extends into the input shaft means (not shown) of the bell housing 19. Shaft 71 extends through the aperture 39.

When installing a motorcycle engine transmission 21 into a dune buggy having a transaxle 11, the adapter plate 31 is first bolted to the housing portion of the output shaft means 25. The shaft 71 is inserted through the aperture 39 with its socket end 73 in engagement with the drive shaft therein. The engine 21 is moved rearwardly until the adapter plate 31 contacts the bell housing 19. The splined end 75 will now be in driving engagement with the input shaft socket (not shown) in the bell housing 19. Also, the bolts 43 will now be enclosed by the adapter plate 31 and bell housing 19. Then, bolts 47 are inserted through the holes 45 in the adapter plate to connect the adapter plate to the bell housing 19.

The invention has significant advantages. The adapter plate 19 allows a motorcycle engine to be mounted in a dune buggy to a transaxle. This results in the vehicle having two transmissions, one integral with the engine and the other integral with the transaxle. This provides a wider range of gear ratios. The motorcycle engine, even if stock, provides high performance and high revolutions. The engine is fuel efficient and water cooled to avoid overheating.

While the invention has been shown in only one of its forms, it should be apparent to those skilled in the art that it is not so limited but is susceptible to various changes without departing from the scope of the invention.

I claim:

1. In a vehicle having a motorcycle engine and transmission, the engine being of a type having upper and lower engine mounting lugs and output shaft means located one one side of the engine and facing rearwardly, the vehicle having a transaxle for driving rear wheels which is mounted with a bell housing facing forwardly, the bell housing encircling input shaft means for driving the transaxle, the improvement comprising in combination:

an adapter plate mounted between the bell housing and the engine, the adapter plate having an aperture positioned in alignment with the output shaft means and the input shaft means, the plate further having a plurality of inner holes encircling the aperture and a plurality of outer holes positioned outward from the inner holes;

a plurality of engine bolts extending through the inner holes and secured to the engine in holes provided around the output shaft means, the heads of the engine bolts being located on the rearward side of the plate to secure the plate to the engine;

a plurality of bell housing bolts extending through the outer holes and secured to the bell housing in holes provided in the bell housing to secure the plate to the bell housing, the plate and bell housing enclosing the heads of the engine bolts when the plate is secured to the bell housing;

upper and lower spaced-apart plate lugs located on the forward side of the plate and bolted to the engine mounting lugs; said upper lugs are located above and to one side of the axis of the aperture, and both lower lugs are located to said one side of and below the axis of the aperture; and a shaft extending through the aperture interconnecting the output shaft means with the input shaft means.

2. A vehicle, comprising in combination:

a frame;

a motorcycle engine, the engine having upper and lower engine mounting lugs and output shaft means located on one side of the engine and facing rearwardly;

a transaxle mounted to the frame for driving rear wheels of the vehicle and having a bell housing facing forwardly, the bell housing encircling input shaft means for driving the transaxle;

an adapter plate mounted between the bell housing and the engine, the adapter plate having an aperture positioned for alignment with the output shaft means and the input shaft means, the plate further having a plurality of inner holes concentrically encircling the aperture and a plurality of outer holes positioned outward from the inner holes;

a plurality of engine bolts extending through the inner holes and secured to the engine in holes provided around the output shaft means, the heads of the engine bolts being located on the rearward side of the plate to secure the plate to the engine;

a plurality of bell housing bolts extending through the outer holes and secured to the bell housing in holes provided in the bell housing to secure the plate to the bell housing, the plate and bell housing enclosing the heads of the engine both when the plate is secured to the bell housing;

a pair of upper plate lugs on the forward side of the plate adjacent the upper edge of the plate, both plate lugs located above and to one side of the axis of the aperture and connected to the upper engine mounting lugs;

a pair of lower plate lugs located on the forward side of the plate adjacent the bottom edge of the plate, both lower plate lugs located to said one side of and below the axis of the aperture and connected to the lower engine mounting lugs;

each of the upper and lower plate and engine mounting lugs comprising a flat member having a hole therethrough through which a bolt extends, coupling the plate lugs to the engine mounting lugs, each upper and lower plate lug being welded to the forward side of the plate perpendicular to the forward side of the plate;

a shaft extending through the aperture interconnecting the output shaft means with the input shaft means; and a support plate mounted to the vehicle frame, extending downwardly and bolted to the adapter plate to provide support.

* * * * *